April 19, 1949. R. R. McKINNEY 2,467,681
FREIGHT CAR
Filed Sept. 25, 1946 5 Sheets-Sheet 2

INVENTOR:
Rex R. McKinney,
BY Paul & Paul
ATTORNEYS.

April 19, 1949.　　　　R. R. McKINNEY　　　　2,467,681
FREIGHT CAR
Filed Sept. 25, 1946　　　　　　　　　　　　5 Sheets-Sheet 5
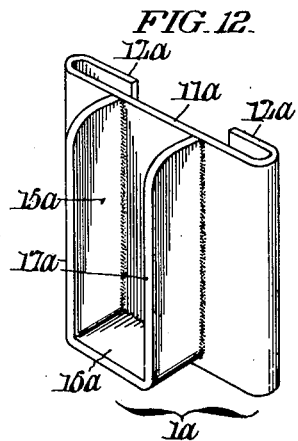
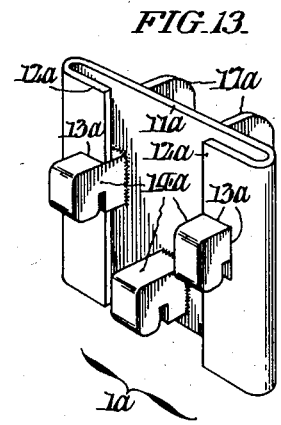
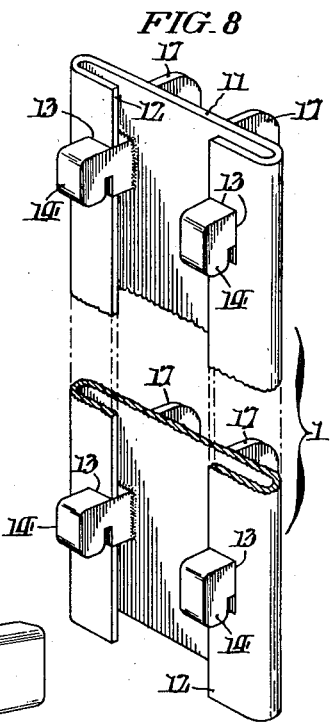
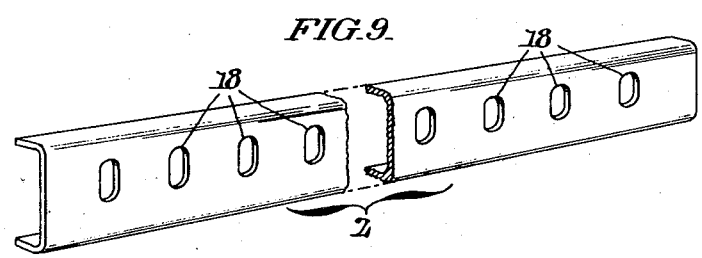
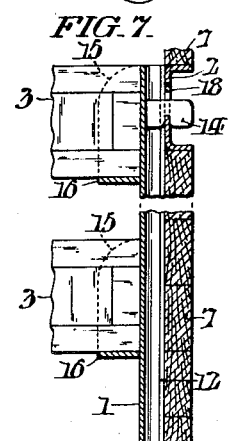
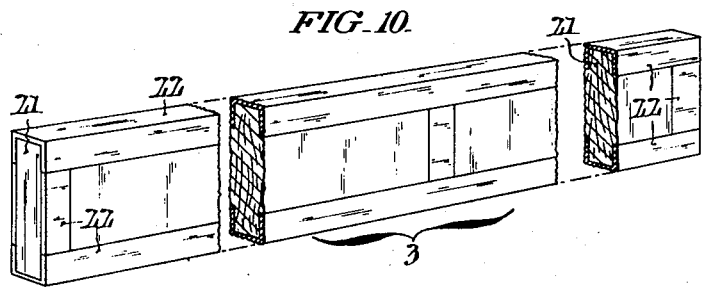
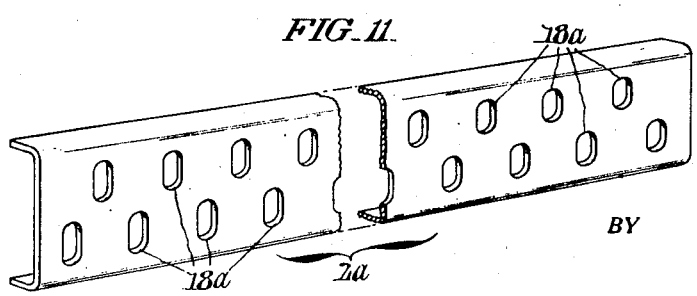
INVENTOR:
Rex R. McKinney,
BY Paul & Paul
ATTORNEYS.

Patented Apr. 19, 1949

2,467,681

UNITED STATES PATENT OFFICE 2,467,681

FREIGHT CAR

Rex R. McKinney, Altoona, Pa., assignor to The Pennsylvania Railroad Company, Philadelphia, Pa., a corporation of Pennsylvania Application September 25, 1946, Serial No. 699,227

4 Claims. (Cl. 105—369)

1

This invention relates to freight cars or like vehicles and more particularly to means for dividing and bracing the lading within such a vehicle to reduce the possibility of damage to the lading as well as to permit more efficient stowage thereof.

Heretofore various devices such as movable bulkheads have been employed for dividing a railway box car into longitudinal compartments, and other devices have been used, including cross bars, partitions and platforms, for effecting a horizontal and vertical division of the lading space. Generally such compartmentation has been accomplished by radical changes in the car structure or by the addition to a box car of expensive portable equipment. In certain instances such portable equipment involves bolts, latches, hinges or other expensive hardware, or parts which are likely to be stolen or lost. In other instances the interior equipment forms a permanent part of the car preventing its conversion to use as an ordinary box car, or reducing the amount of usable space therein.

It is highly desirable that a box car be so compartmented and equipped with means for dividing and bracing the lading that it may be readily converted to use with different types of lading, without sacrifice of any of the usable space therein and that it be possible at times to remove all such interior equipment in order to gain the full use of the entire space within the car without obstruction. It is also desirable that existing box cars now in common use may be easily adapted, without expensive additions or alterations, for the installation of cross bars, platforms and the like disposed at different levels and at selected positions longitudinally of the car. Furthermore, there is definite advantage in simplifying the portable and removable interior equipment and reducing the bulk thereof to a minimum, and in avoiding the use of parts which are difficult to maintain in operating condition or are subject to theft.

This invention avoids the above mentioned difficulties commonly experienced with older forms of box cars equipped with means for dividing and bracing the lading, and accomplishes the desirable ends which have been referred to above. Still other more specific objects and advantages characterizing the invention will become more apparent from the description of a preferred embodiment thereof which follows hereinafter having reference to the accompanying drawings. Of the drawings:

Fig. 5 represents a fragmentary section similar to Fig. 2, but showing a smaller portion of the car and illustrating a modification in which single-pocket hanger elements are employed in association with multiple-pocket hanger elements;

Fig. 6 represents an enlarged cross section taken as indicated by the arrows VI—VI of Fig. 5 showing details of a single-pocket type of hanger element;

Fig. 7 represents an enlarged cross section taken as indicated by the arrows VII—VII of Fig. 5 showing details of a multiple-pocket type of hanger element;

Fig. 8 represents an enlarged rear perspective view, with certain portions broken away, of the multiple-pocket hanger element;

Fig. 9 represents an enlarged perspective view of a perforated channel bar of the type shown in Fig. 2;

Fig. 10 represents an enlarged perspective view of a cross bar used with either form of the invention;

Fig. 11 represents an enlarged perspective view of a perforated channel bar of the modified type shown in Fig. 5; and Figs. 12 and 13 represent enlarged perspective views, front and rear of the single pocket type of hanger element.

Figure 1:
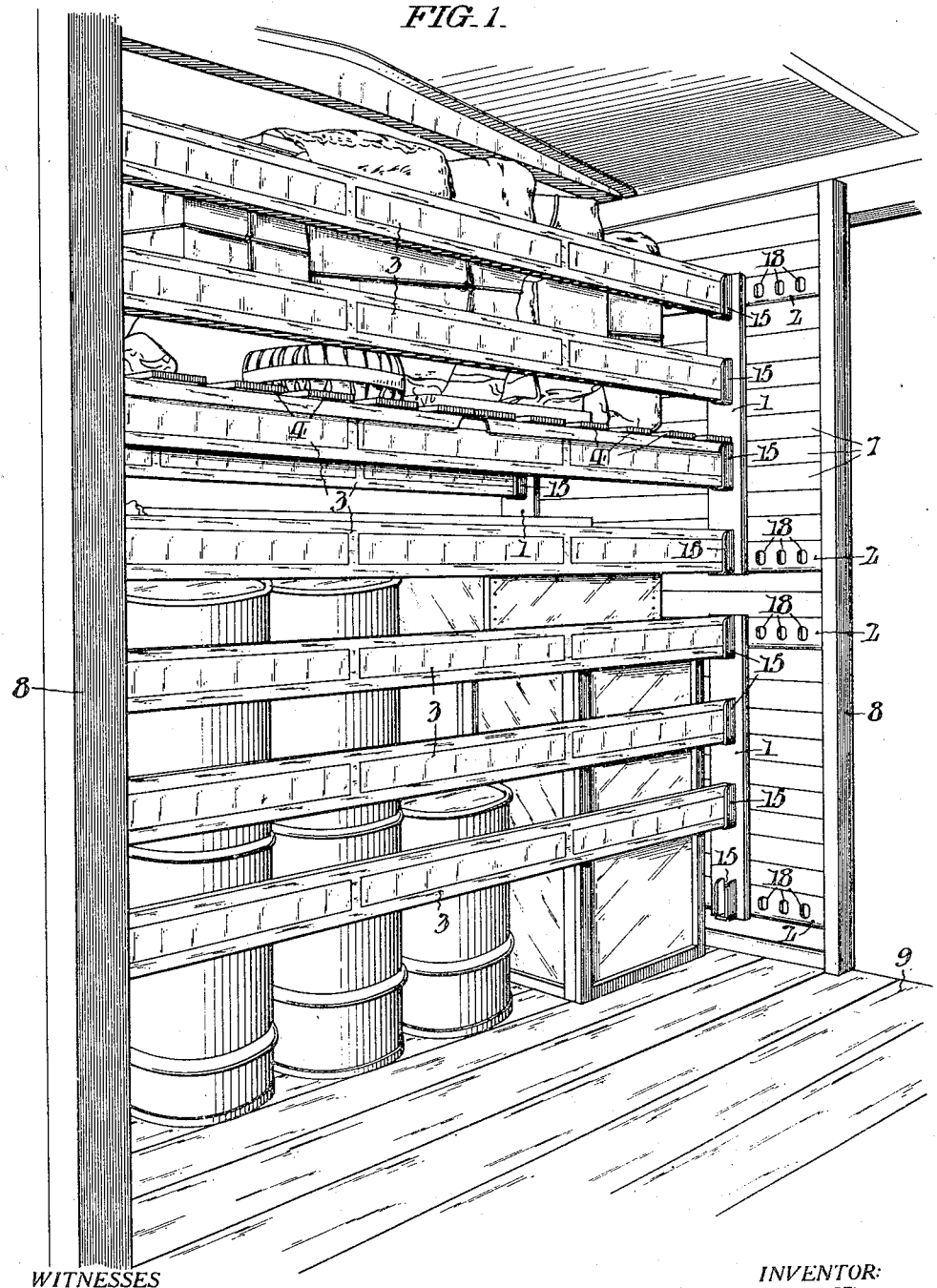
Fig. 1 represents a perspective view of the interior of a railway car embodying multiple-pocket hanger elements of my invention.

With reference to Fig. 1 of the drawings there is shown a perspective view of the interior of a freight car equipped with devices of my invention and showing the use of multiple-pocket hanger elements 1 supported by perforated channel bars 2 at the side walls of the car. The lading within the car is divided and braced by a series of cross bars 3 which extend transversely from the hanger elements 1 at one side of the car to similar elements at the opposite side of the car. Further division of the lading is effected by horizontally disposed planks or platforms 4 resting on the cross bars 3. By varying the positions of the cross bars 3 and such horizontally or vertically disposed platforms or partitions as it may be desired to use therewith it is possible to divide the interior lading space into a large number of compartments of the desired dimensions to conform to the commodities being carried and to the most convenient method of stowing them. Such stowage may extend to the vicinity of the car roof with the variously shaped articles arranged compactly and braced at all times against shifting.

Figure 2:
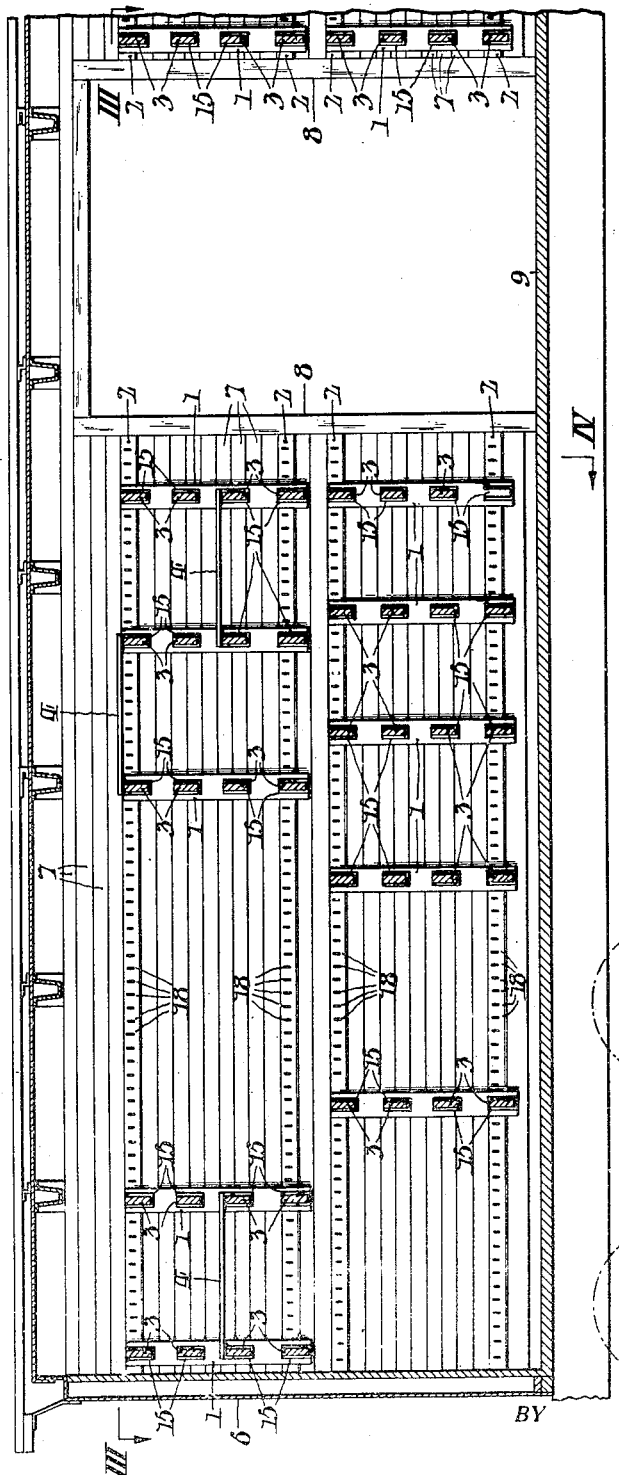
Fig. 2 represents a longitudinal vertical cross section of a sufficient portion of the car to illustrate the interior construction thereof, the section being taken as indicated by the arrows II—II of Fig. 3.
Figure 3:
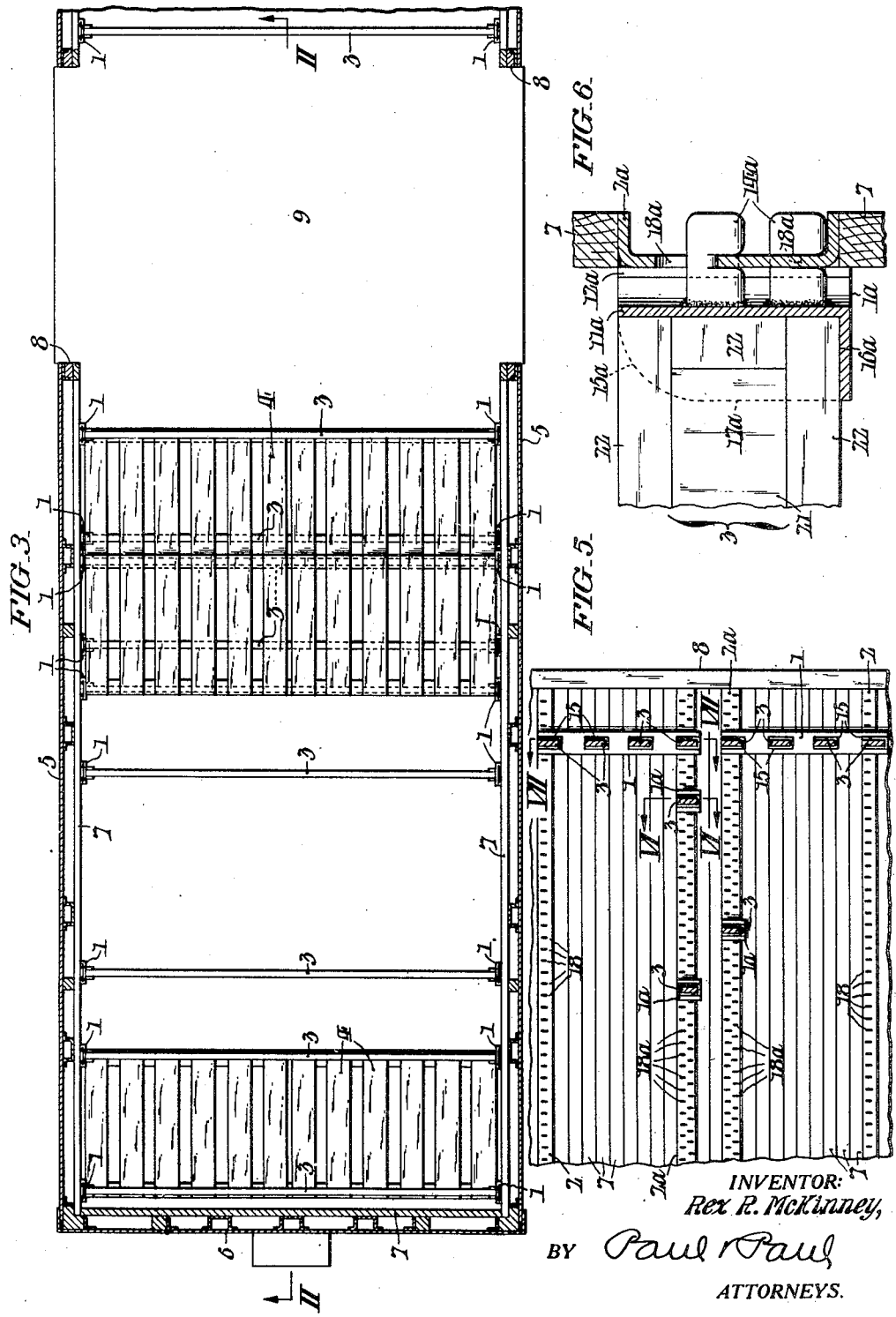
Fig. 3 represents a horizontal cross section of the same taken as indicated by the arrows III—III of Fig. 2.
Figure 4:
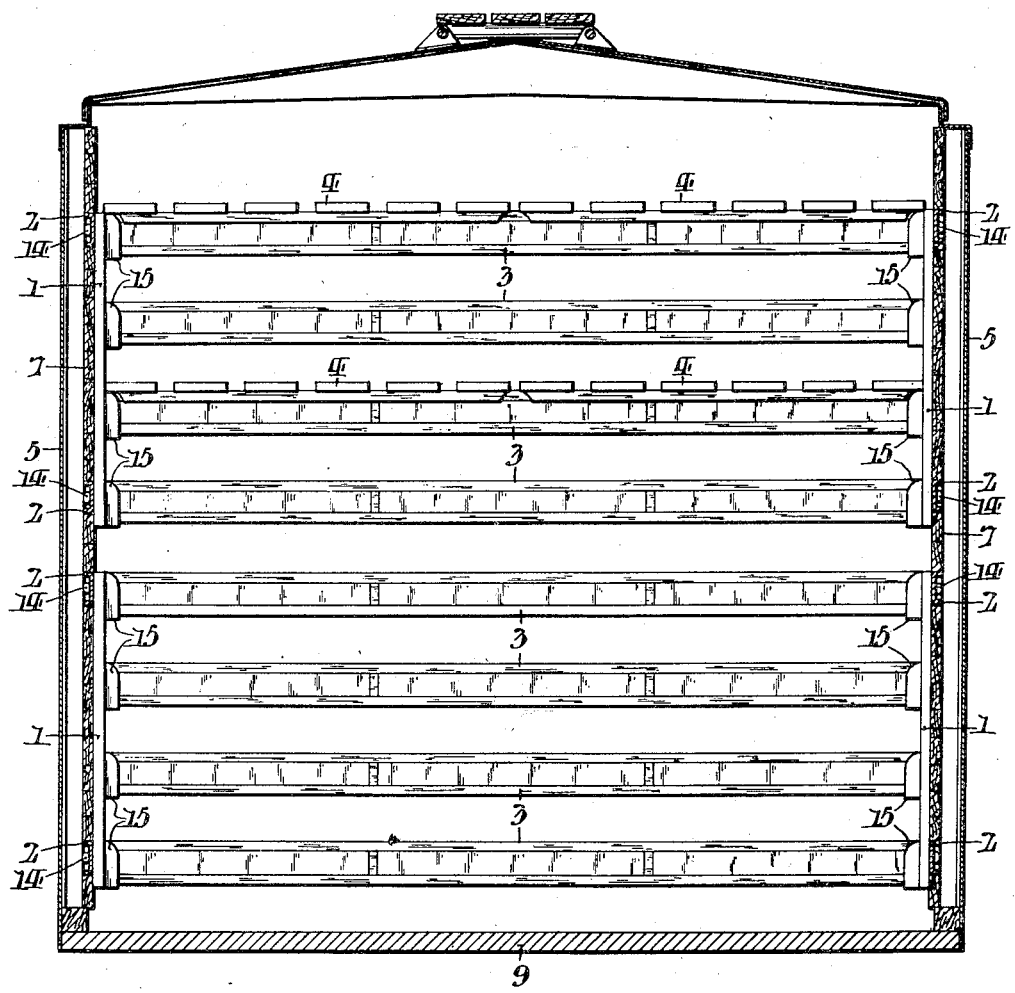
Fig. 4 represents a transverse vertical cross section of the same taken as indicated by the arrows IV—IV of Fig. 2.

As shown in Figs. 2, 3 and 4 the freight car is in general a conventional form of box car in which the side and end walls 5 and 6 are of a usual construction having a lining 7 consisting of boards or the like presenting smooth interior wall surfaces interrupted only by the door openings 8. Perforated channel bars 2 are embedded in the side walls 5 in such manner that the webs of the channel bars 2 are flush with the lining 7. Desirably such channel bars 2 constitute structural members extending from one end of the car to the other except as interrupted by the door openings 8 where various devices may be employed for confining the lading. Such devices to be employed at the door openings 8 form no part of the present invention and hence are not described herein. Preferably also the channel bars 2 are arranged in pairs at different levels with equal vertical spacing between the bars of each pair whereby all of the hanger elements 1 are interchangeable as between higher and lower levels and the upper portions of the lading space may be compartmented differently from the lower portions of such space, thus making for a more flexible division of space. The car floor 9 is of a usual construction and is unobstructed throughout the length thereof.

The arrangement illustrated in Figs. 5 and 6 of the drawings represents a modification in which two channel bars, these being designated at 2a, are provided with a double row of perforations, and in addition to the multiple-pocket hangers 1 a number of single-pocket hangers 1a are employed for supporting the cross bars 3. In all other respects the construction of the car as thus modified may be assumed to be similar to the showings of Figs. 1 to 4.

Details of the various bars and hanger elements are shown in Figs. 7 to 13. Each multiple-pocket hanger element 1 comprises a flat plate 11 bent to provide stiffening flanges 12 at the rear face, see Figs. 7 and 8, such flanges being in spaced parallel relation to the plate and being notched at 13 to accommodate outwardly projecting hooks 14 which are welded to the plate and fit snugly within the notches. The hooks 14 project through the notches 13 and receive incidental support from the surrounding edges of the notches. They are thus firmly secured. Desirably the hooks 14 are arranged in vertically spaced pairs there being one horizontal pair of hooks near the top of the hanger element 1 and another pair near the bottom thereof. At the front face of the hanger element 1, in the illustrated example of the invention, four pockets 15 are provided, each pocket consisting of a ledge 16 with vertical side flanges 17 adapted to receive the end of a cross bar 3.

In the modified arrangement in which single-pocket hanger elements 1a are used in association with multiple-pocket hanger elements 1 the same general type of construction is employed. Each single pocket hanger element, as shown in Figs. 12 and 13, consists of a flat plate 11a bent to provide stiffening flanges 12a at the rear face of the hanger element. A pocket 15a consisting of a ledge 16a and vertical side flanges 17a is provided at the front face. The hooks 14a, however, are preferably disposed in a triangular relation with two hooks in a horizontally spaced relation and a third hook disposed centrally beneath the horizontal pair.

As shown in Fig. 9, the channel bars 2 have a single row of perforations 18 spaced to correspond with the spacing between each horizontal pair of hooks 14 of a multiple-pocket hanger element 1. On the other hand the channel bars 2a, shown in detail in Fig. 11, which are employed wherever it is desired to use a single-pocket hanger element, have a double row of perforations 18a. With these bars 2a the same horizontal spacing between perforations is used so that either type of hanger element may be detachably suspended from the bar. It will be observed that either form of hanger element 1, 1a may be readily applied to the channel bars 2, 2a in any desired position by insertion of the hooks 14, 14a within selected perforations 18, 18a of the bars, and when so applied will be firmly held against disengagement by any force except an upward and inward movement. The hanger elements 1, 1a are thus locked in place by the cross bars 3 when such bars are fitted within the pockets thereof, but after removal of the cross bars they may be detached by hand and relocated according to the desired arrangement.

Each cross bar 3 may take the form illustrated in Fig. 10 in which the bar consists of a wooden beam 21 reinforced at the top and bottom and at the ends thereof by metal sheathing 22. All of the removable interior equipment including the hanger elements 1, 1a, the cross bars 3, planks 4 and any other platforms or partitions which may be employed for dividing and bracing the lading are thus made of rugged and simple construction with avoidance of the use of moving parts such as bolts, latches, hinges or the like.

It will be apparent that the use of hanger elements and associated parts following the teachings of this invention provides a very flexible arrangement for dividing and bracing the lading in the most desirable manner. The cross bars 3 may be so arranged as to provide a bulkhead extending substantially from the floor to the top of the car. In some cases it may be desirable to erect a bulkhead for only the top or bottom half of a load, or to erect a single cross bar at a certain point along the length of the car. When a bulkhead is to be removed one cross bar is detached at a time thus reducing the danger of damaging the lading. By the use of multiple-pocket hanger elements with the pockets vertically spaced as shown herein bulkheads or bulkhead sections may be erected at any point in the car, and platforms can be supported thereon at any desired level. Moreover, it is a simple matter to convert an ordinary form of box car to a box car embodying the present invention by incorporating therein the relatively few specially formed elements which characterize this invention; and whenever it may be desired to reconvert such a car to a plain sided car this may be readily accomplished by the simple expedient of removing the hanger elements, cross bars and other portable equipment.

Although I have described and illustrated my invention in considerable detail showing the preferred form and arrangement of the means employed for dividing and bracing the lading, including a modification in which single-pocket hanger elements are used, it will be apparent to those skilled in the art that numerous changes may be made and that certain features of the invention may be used to advantage without a corresponding use of other features, all without departing from the spirit of the invention as defined in the annexed claims.

Having thus described my invention, I claim:

1. In a freight car the combination of perforated structural members embedded in the side walls of the car and spaced at different elevations from the floor, and a series of portable hanger elements adapted to be removably attached to said structural members, each hanger element having vertically spaced outwardly projecting hooks for interlocking engagement with vertically spaced perforations in one or more of said structural members and having an inwardly projecting pocket for receiving the end of a removable cross bar for dividing and bracing lading within the car, said pocket comprising a ledge with upstanding flanges for supporting and holding the end of said cross bar against any movement other than in an upward direction, and said hooks rigidly connecting with the structural members to resist longitudinal thrust of the lading.

2. In a freight car as defined in claim 1 structural members in the form of horizontal channel bars arranged in pairs at different levels with equal vertical spacing between the bars of each pair.

3. In a freight car as defined in claim 1 a vertically disposed hanger element bridging from a structural member at one level to a structural member at a different level and having a plurality of inwardly projecting pockets whereby a cross member may be applied thereto at an intermediate level.

4. In a freight car as defined in claim 1 a hanger element comprising a plate bent to provide stiffening flanges at its rear face and having its hooks attached to the plate and projecting through holes in said flanges with incidental support from the surrounding edges at said holes.

REX R. McKINNEY.

REFERENCES CITED

The following references are of record in the file of this patent:

UNITED STATES PATENTS

| Number | Name | Date |
| --- | --- | --- |
| Re. 20,860 | Thomas | Sept. 13, 1938 |
| 717,316 | Avery | Dec. 30, 1902 |
| 841,777 | Hamilton et al. | Jan. 22, 1907 |
| 1,227,703 | Ulrich | May 29, 1917 |
| 1,238,874 | Biela | Sept. 4, 1917 |
| 1,702,169 | Norman | Feb. 12, 1929 |
| 2,091,869 | McCurdy | Aug. 31, 1937 |
| 2,359,109 | Hormes | Sept. 26, 1944 |